(12) United States Patent
DeSimone et al.

(10) Patent No.: US 9,535,629 B1
(45) Date of Patent: Jan. 3, 2017

(54) STORAGE PROVISIONING IN A DATA STORAGE ENVIRONMENT

(71) Applicant: EMC Corporation, Hopkinton, MA (US)

(72) Inventors: Salvatore DeSimone, Woodbury, CT (US); Suresh K Biddappa, Murphy, TX (US); Vladislav Dranov, Irving, TX (US); Michael G. Hegerich, Holliston, MA (US); Patrick J. Hunt, Baltimore, MD (US); Anurag Jain, Murphy, TX (US); Adam C. LaPlante, Richardson, TX (US); Stephen A. Mendes, Wellesley, MA (US); Anoop G. Ninan, Milford, MA (US); Thomas L. Watson, Richardson, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 13/886,644

(22) Filed: May 3, 2013

(51) Int. Cl.
*G06F 12/00* (2006.01)
*G06F 3/06* (2006.01)

(52) U.S. Cl.
CPC .......... *G06F 3/0665* (2013.01); *G06F 3/0619* (2013.01); *G06F 3/0689* (2013.01)

(58) Field of Classification Search
CPC ...... G06F 3/0665; G06F 3/0667; G06F 3/067; G06F 9/5061

USPC ......................................................... 711/114
See application file for complete search history.

(56) References Cited

U.S. PATENT DOCUMENTS

| 8,407,323 B2* | 3/2013 | Flavel et al. ................. 709/220 |
| 2012/0158806 A1* | 6/2012 | Snyder et al. ................ 707/827 |

OTHER PUBLICATIONS

EMC VPLEX 5.0 Architecture Guide, White Paper, Apr. 2011.*
EMC Smarts Netowrk Configuration Manager, Data Sheet, 2012.*
Using VMWARE Vsphere with EMC VPLEX, Best Practices Planning, White Paper, Jul. 2011.*
Aspesi et al., EMC VPLEX Metro Witness Technology and High Availability, Version 2.1, 2012.*

* cited by examiner

*Primary Examiner* — Ryan Bertram
*Assistant Examiner* — Edmund Kwong
(74) *Attorney, Agent, or Firm* — Krishnendu Gupta; Joseph D'Angelo

(57) ABSTRACT

A method, computer program product and system enabling provisioning of a storage volume across network resources through the storage provisioning interface, wherein the storage provisioning interface enables provisioning of network resources to enable presentation of a provisioned storage volume, wherein the provisioned storage volume is enabled to be provisioned across a plurality of storage resources across the network resources, and wherein the provisioned storage volume is enabled to be a redundant distributed volume.

23 Claims, 19 Drawing Sheets

STORAGE PROVISIONING IN A DATA STORAGE ENVIRONMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application related to data storage.

RELATED APPLICATIONS

This Application is related to U.S. patent application Ser. No. 13/630,455 entitled "SINGLE CONTROL PATH" filed on Sep. 28, 2012, Ser. No. 13/631,030 entitled "METHOD AND APPARATUS FOR FEDERATING A PLURALITY OF ONE BIG ARRAYS" filed on Sep. 28, 2012, Ser. No. 13/631,039 entitled "METHOD AND APPARATUS FOR AUTOMATED INFORMATION LIFECYCLE MANAGEMENT USING A FEDERATION OF ARRAYS" filed on Sep. 28, 2012, Ser. No. 13/631,055 entitled "METHOD AND APPARATUS FOR FEDERATED IDENTITY AND AUTHENTICATION SERVICES" filed on Sep. 28, 2012, Ser. No. 13/631,190 entitled "APPLICATION PROGRAMMING INTERFACE" filed on Sep. 28, 2012, Ser. No. 13/631,214 entitled "AUTOMATED POLICY BASED SCHEDULING AND PLACEMENT OF STORAGE RESOURCES" filed on Sep. 28, 2012, Ser. No. 13/631,246 entitled "DISTRIBUTED SYSTEM SOFTWARE INFRASTRUCTURE" filed on Sep. 28, 2012, and Ser. No. 13/776,786 entitled "DISTRIBUTED WORKFLOW MANAGER" filed on even date herewith, Ser. No. 13/886,789 entitled "PORT PROVISIONING SYSTEM" filed on even date herewith, Ser. No. 13/886,892 entitled "SCALABLE INDEX STORE" filed on even date herewith, Ser. No. 13/886,915 entitled "SCALABLE OBJECT STORE" filed on even date herewith, and Ser. No. 13/886,687 entitled "STORAGE PROVISIONING IN A DATA STORAGE ENVIRONMENT" filed on even date herewith, which are hereby incorporated herein by reference in their entirety.

BACKGROUND

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein. In a common implementation, a Storage Area Network (SAN) is used to connect computing devices with a large number of storage devices. Management and modeling programs may be used to manage these complex computing environments.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host. In such arrangements, the front end component of the first data storage system may become a bottleneck in that the front end component processes commands directed to devices of the first data storage system and, additionally, performs processing for forwarding commands to other data storage systems of the pool as just described.

Often cloud computer may be performed with a data storage system. As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation," a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

SUMMARY

Figure 1:
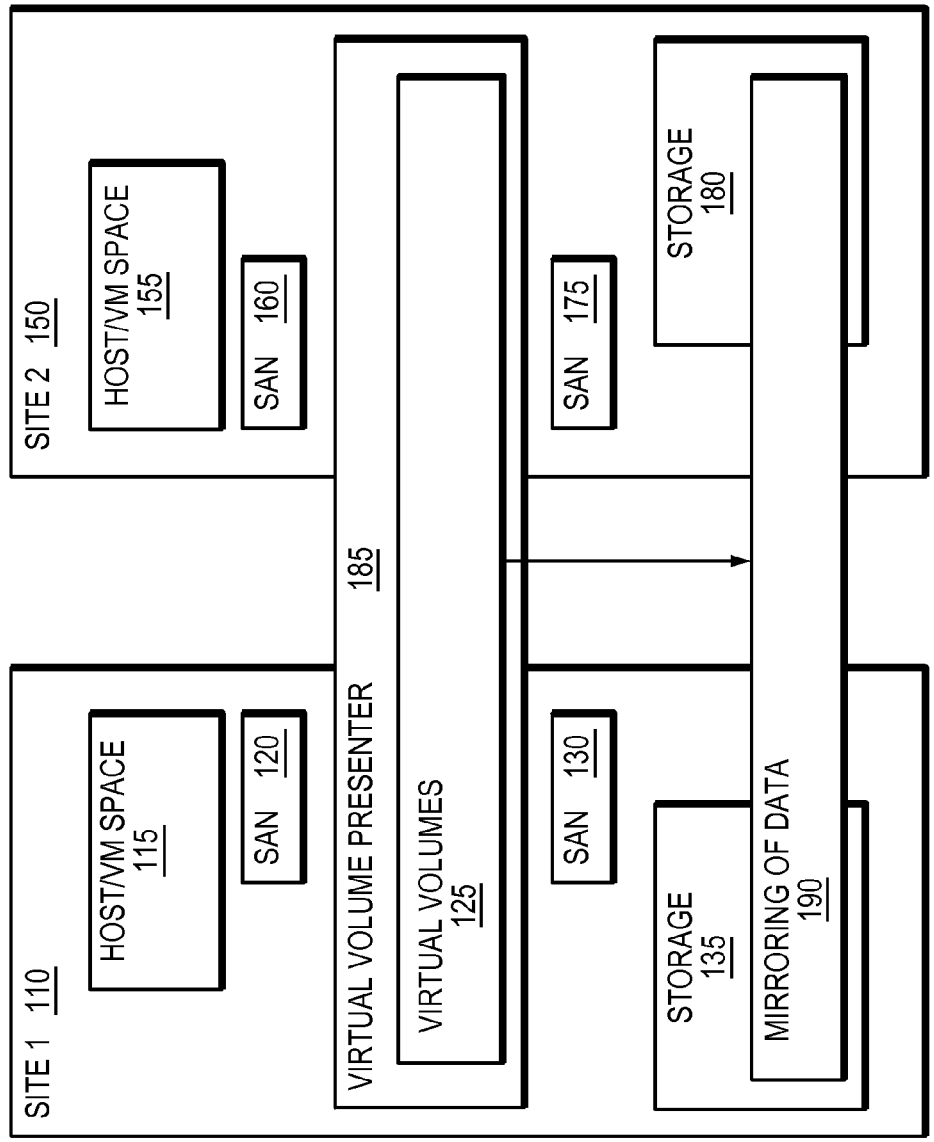
FIG. 1 is a simplified illustration of a data protection system, in accordance with an embodiment of the present disclosure.

A method, computer program product and system enabling provisioning of a storage volume across network resources through the storage provisioning interface, wherein the storage provisioning interface enables provisioning of network resources to enable presentation of a provisioned storage volume, wherein the provisioned storage volume is enabled to be provisioned across a plurality of storage resources across the network resources, and wherein the provisioned storage volume is enabled to be a redundant distributed volume.

DETAILED DESCRIPTION OF EMBODIMENT(S)

Conventionally, storage administrators choose the underlying storage arrays and storage pools manually. Typically, storage administrators use the storage pools to create the replicated underlying storage volumes. Generally, an administrator ensures connectivity between the a virtual service layer, such as VPLEX, back-end ports and the underlying storage arrays by manually adding SAN zones, if necessary, and conventionally may create an exportGroup on underlying storage, if necessary. Usually, an administrator configures a virtual service layer to create a virtual volume. Commonly, an administrator has to re-discover the LUNs presented by underlying Storage Arrays. Typically, the administrator claims the underlying storage volumes. Conventionally, an administrator may have had to create extents and local devices from the underlying volumes. Generally, an administrator may have had to create distributed device from the local devices. Usually, an administrator would have to create a virtual volume from the distributed devices.

In certain embodiments, the current disclosure may enable orchestration of End-to-End Storage Provisioning using a Storage Virtualization Appliance in conjunction with a SAN Network and underlying Storage Arrays to provide the physical storage to the virtual storage. In a particular embodiment, the enabled orchestration may provide Federated Storage for Converged Infrastructure Services consisting of compute, storage, and networking resources that may be used for virtual services by virtual machines such as that of VMWare Vsphere. In another embodiment, the orchestration may provide Federated Storage to the heterogeneous storage platforms that supports Storage and SAN Networking provisioning.

In most embodiments, when building out a service that will support applications running in multiple locations, one of the main challenges may be providing the same data to all those users (some of whom may be in a location that is a great distance away from others). In certain embodiments, as in a stretched cluster, a group of hosts that are clustered together may provide the computing power for a service, but some of the hosts may be in a geographically different location than others, allowing uninterrupted service should one location become unavailable.

In some embodiments, the current disclosure may enable seamless migration of data between devices, which may enable data of an application to be moved transparently to a user. In another embodiment the current disclosure may enable a Virtual Storage federation to achieve transparent mobility and access in a data center and between data centers. In further embodiments, the current disclosure may enable resiliency by mirroring data across arrays within a single data center or between data centers without host impact, which may increase availability for critical applications. In still further embodiments, the current disclosure may enable distributed cache coherency to automate sharing, balancing, and failover of I/O across the cluster and between clusters whenever possible. In other embodiments, the current disclosure may enable advanced data caching to improve I/O performance and reduce storage array contention.

Conventionally, allocation and provisioning of the federated storage required for such a cluster has typically been a complex process, requiring many steps and can be error prone. In certain embodiments, the current disclosure may automate the provisioning, configuration and presentation of the storage to the hosts, providing end-to-end provisioning in a single pane of glass. In most embodiments, enabling end-to-end provisioning in a single pane of glass may benefit end users and IT specialists.

Previously, in order to configure federated storage, an end-user who needed distributed storage for their application had to engage IT specialists from multiple silos within their organization, be authorized by multiple entities to acquire resources, and then wait for the resources to be made available. Typically, then multiple IT specialists had to configure multiple components, use disparate management tools, manually track parameters being configured (such as WWNs, etc), all the while communicating needs within their own departments. Conventionally, performing regular configuration tasks in this manner was difficult, error prone, requires intimate knowledge of each component and has to be repeated whenever requirements expand.

In further embodiments, end-users may control the entire storage process from a single application, use pre-authorized resources from a pool, and configure the storage, network & access to hosts without need of using separate tools and acquiring multiple authorizations and knowing the details of each underlying domain. In certain embodiments, IT specialists may add resources to pools to make them available to end-users before the resources are needed, see what resources were claimed and how much is left, while enabling automated managing of pools of IDs (like WWNs, etc).

In a particular embodiment, a user may start by specifying properties of a storage service that may contain storage that is to be distributed across locations or sites. In at least one embodiment, the user may use a GUI to specify the predetermined grade of storage (e.g.: gold, silver, etc) and the size of the volumes to be included. In some embodiments, once planned, the service may be provisioned, which may start a workflow engine that may communicate through a driver that issues commands to the underlying storage array where the physical storage exists. In certain embodiments, the workflow engine may enable the storage to be allocated based on the requested grade. In further embodiments, the workflow engine may enable networking tasks to be carried out to expose the volumes to the storage virtualization component (e.g.: EMC's VPLEX). In at least some embodiments, after provisioning and networking, a second storage array in the remote location may be similarly provisioned and networked. In further embodiments, staging commands may be issued to a storage virtualization layer where created storage volumes are claimed and packaged into a distributed volume.

In other embodiments, a user may be presented with the storage service they requested, containing the requested storage. In some embodiments, a user may attach this storage service to any other standard services in the system, allowing the services to access the same storage. In certain embodiments, if there is a stretched cluster, the hosts in one location may be part of one standard service, and may represent one half of the cluster, while another standard service may contain the hosts in the other half of the cluster. In some embodiments, standard services may be separated by geography.

In an embodiment, after attaching the services a workflow engine may start the process of provisioning the necessary networking components to make the distributed storage visible to the hosts in the standard services. In most embodiments, the engine may synchronize the storage into one cluster in the cloud management component (e.g.: VMWare's vSphere). In certain embodiments, a user may increase the storage or number of hosts in an elastic fashion without service interruption, and decommission it when no longer needed, returning the resources to be reused by other services.

In certain embodiments, storage allocation requests may be made by a User Interface to an API Layer. In some embodiments, an API Layer may support a createVolumes method that may create one or more storage volumes of a user specified size and with a user specified Class of Service (given by a CoS entry in the Database.) In at least some embodiments, an API Layer may support an exportGroupCreate method that may export one or more storage volumes to one or most host computer systems.

In certain embodiments, the Class of Service associated with provisioned storage may be set up by the System Administrator. In certain embodiments, Class of Storage (CoS) may specify attributes about the Storage Pool to be selected, such as the RAID Levels, Disk Drive Types, System Types, and Protection Type. In an embodiment, an API Layer may use a class of service to select a hardware Storage Array and a Storage Pool within an array to create storage volumes. In most embodiments, Class of Service entries may enable specific attributes to be enumerated that may define selection of pools with particular characteristics. In at least one embodiment, a Storage Pool Grade may allow an administrator to manually group Storage Pools together into categories called Grades that may be specified for Storage Pool selection.

In certain embodiments, Class of Service may include High Availability type, which may be used to determine the location(s) of the storage array used for the storage. In an embodiment, high availability type of storage may be a local volume stored in one neighborhood, which may be a geographic location such as a data center. In other embodiments, high availability type of storage may be a distributed virtual volume stored in two neighborhoods. In further embodiments, other types of virtualization platforms (other than VPLEX) may support additional or alternate high availability types. In some embodiments, high availability may cause storage provisioning orchestration to choose redundant Storage Arrays in different geographical locations to hold replicated copies of the volume(s). In an embodiment, a Storage Pool that is compatible with the CoS entry may be selected on each Storage Array and used to make the physical storage volumes. In at least some embodiments, replicated physical storage volume(s) may be combined by the Virtualization Hardware (e.g. the VPLEX) to make a distributed virtual volume.

In a first embodiment, an orchestration layer may be enabled to orchestrate creation of an underlying Storage Volume on two different Hardware Storage Arrays for a volume requested to be created by a user. In this embodiment, the underlying volumes may be used to provide data redundancy for the storage volume in different geographical locations. In some embodiments, the underlying volumes may be created by the orchestration layer if needed. In another embodiment, the orchestration layer may be enabled to arrange for connectivity between the virtual service layer hardware, such as EMC's VPLEX, and underlying Storage Array hardware (such as EMC's VMAX or VNX). In some embodiments, the creation of the connectivity may be performed by creating one or more SAN zones. Virtual Service layer back-end ports may serve as initiators to array front-end ports. In further embodiments, by creating a Mapping/Masking View on the underlying Storage Arrays that associates initiators, storage ports, and logical units (volumes) that may be used by the initiators. In still further embodiments, the orchestration layer may be enabled to set up a virtual volume on a virtual service layer, such as EMC's VPLEX. In some embodiments, a virtual volume may be distributed so as to be accessible from two different geographical locations. In further embodiments, the virtual volume may be managed by the virtual service layer and may be stored in a replicated fashion on the underlying storage volumes. In most embodiments, the user may store user data in a virtual volume, which may cause a virtual service layer to replicate the user data and store it in the underlying storage array volumes.

In some embodiments, when a Virtual Volume has been created, it may be exported. In certain embodiments, the export may occur with an exportGroupCreate API call. In most embodiments, the exportGroupCreate API call may occur once on each neighborhood or network representing a geographical location. In at least some embodiments, the exportGroupCreate API call may create a SAN Zone that allows communication between the client Host(s) and virtual service layer front-end ports. In other embodiments, the exportGroupCreate API call may create virtual service layer Storage View structures that may export the volume(s). In certain embodiments, the exportGroupCreate API call may create Mapping/Masking views if required by the API request.

In certain embodiments, API calls may enable unexporting and deleting virtual volumes. In most embodiments, the orchestration API may enable tear down of the various components that were created from the top-down (in reverse order of creation) in a centralized automated way.

In certain embodiments, the current disclosure may enable distributed access to storage volumes in an active-active configuration with a virtual service layer configuration. In other embodiments, the current disclosure may enable migration of storage volumes from one geographical location to another geographical location transparently without down time. In further embodiments, the current disclosure may enable migration of storage volumes from one Storage Array to a different Storage Array transparently without down time. In certain embodiments, migration may be used to upgrade array hardware to a newer technology or to change the storage Class of Service to an array with different performance/cost trade-offs without having to limit access to the virtual volume.

In certain embodiments, a user may select an appropriate CoS or Storage Pool Grade for the creation of storage volumes. In other embodiments creation of volumes may be automated through an API call and an orchestration engine. In at least one embodiment, the CoS or Storage Pool Grade may be used for the creation of volumes through an API call using an orchestration engine. In some embodiments, unprotected/non virtualized volumes and protected/virtualized volumes may be created.

In certain embodiments, in response to a request for a virtual storage volume a determination may be made how many storage volumes are needed to satisfy the request. In some embodiments, the storage arrays available to use to create the volumes may be determined. In most embodiments, a determination may be made which storage pools are available for the virtual storage volumes. In some embodiments, Storage Arrays may be determined by analyzing the virtual service layer configuration to identify the associated arrays to identify the arrays associated with the virtual storage hardware layer. In an embodiment, a Storage Pool may be selected from a pull down list of available pools pre-populated by automated array discovery drivers.

In other embodiments, a end user may specify a primary neighborhood name (geographic location of the volume) and Class of Service entry (CoS) by name that may indicate a Virtual service layer and distributed Virtual Volume that may be used and what attributes must be present in the Storage Pools to be selected. In some of these other embodiments, a end user may optionally specify the secondary neighborhood name which could be used to identify the other geographic location for the distributed copy of the volume. In certain embodiments, an orchestration API may identify Storage Arrays that have suitable Storage Pools that can be protected by a virtual service layer in the secondary neighborhood. In further embodiments, a user does not specify a secondary neighborhood using the orchestration API, an appropriate secondary neighborhood may be chosen that may be used for virtual service layer protection and the requisite Storage Pools to satisfy the virtual volume request.

In some embodiments, the orchestration API may enable creating the (underlying) Storage Volumes on the Storage Arrays. In embodiments with a virtual service layer, creating storage volumes may occur twice. In most embodiments, creation of a storage volume may use information specified in the orchestration API. In certain embodiments, the orchestration API may have driver information for the storage arrays in the data storage environment.

In at least some embodiments, the orchestration API may be enabled to create connectivity between storage components, such as the virtual service layer, storage arrays, switches and hosts. In an embodiment, the orchestration API may create SAN Zones between the (underlying) Storage Arrays and Back End Ports of the virtual service layer. In most embodiments, creation of network connectivity may be performed for each geographical location (neighborhood) used in the virtual service layer distributed volume, and each time may require creating several Zones in the configuration (often one for each Back End Port of the virtual service layer to be used).

In most embodiments, the orchestration API may be able to select appropriate Storage Ports and Virtual service layer Ports to be used, and may create the appropriate connectivity or zones in each neighborhood. In further embodiments, connectivity or previously created zones may be used to support newly created volumes or virtual volumes.

In some embodiments, a Storage Array Export Group may be created. In most embodiments a storage array export group may contain identifiers for Host Initiators, Volumes, and Storage Ports to be used for exporting the volume from the Storage Array to a virtual service layer. In certain embodiments, creating a storage array export group may be repeated for each Storage Array used to construct the distributed volume. In further embodiments, if a storage array export group exists, the group may be reused for future virtual storage volumes if it satisfied the parameters in the orchestration API. In an embodiment, reuse of a group for future virtual volumes may require the addition of the underlying volumes (or LUNS) for the new virtual volume to be added. In some embodiments, an Orchestration API may determine if a satisfactory Storage Group exists, decides to create a new Storage Group or add the volume to an existing Storage Group, and may call the device driver to configure the Export Group. In some embodiments, creation of a storage array export group may involve sub-steps of creating an Export Mask or Masking View, creating Initiators or Host entries, etc. as determined by the device driver.

In most embodiments, Storage Volume(s) may be claimed by the virtual service layer. In certain embodiments, the virtual service layer may not be able to use the underlying storage until the storage has been created and exported to the virtual service layer. In some embodiments, an Orchestration API may cause the virtual service layer through a driver to perform a "rediscovery" operation on the virtual service layer to locate newly created volumes and to claim the volume.

In some embodiments, the orchestration API may cause the virtual storage layer to create extents representing the Storage Volume(s). In certain embodiments, creating the extents may create a mapping in the virtual service layer called an "Extent" that specifies what portion (or all) of a volume may be intended to be used. In most embodiments, an Orchestration API using a virtual service layer device driver may create extent(s) for each underlying volume.

In some embodiments, the orchestration API may create a local device on the virtual service layer that represents a virtual storage layer local "device." In most embodiments, creation of the local device at the virtual storage layer is performed by an Orchestration API using a virtual service layer device driver that creates the device(s) for each underlying volume.

In further embodiments, a distributed device may be created at the virtual service layer. In most embodiments, this step may be performed if a distributed virtual volume is being created. In some embodiments, an Orchestration API using a virtual service layer device driver may create a Distributed Device from the two local devices that were created.

In most embodiments, the orchestration API may create a virtual volume using the virtual service layer. In certain embodiments, a virtual volume may be considered distributed if the volume is created from a Distributed Device. In other embodiments, if a volume is not created from a distributed device, the volume may be a local volume. In some embodiments, the orchestration API may use a virtual service layer driver to create a Virtual Volume from a Distributed Device or a local Device.

In certain embodiments, the orchestration API may determine the WWN (World Wide Name) addresses for each of the Host Initiators (Host SAN Ports). In some embodiments, the orchestration API may provision the Initiators in a UCS Blade with a value selected from a pre-defined Storage Pool. In at least one embodiment, the orchestration API may store the WWN values in an internal database. In other embodiments, the orchestration API may automatically discover WWNs using an external management agent. In some of these embodiments, the orchestration API may select initiators from an internal database. In still further embodiments, a user may provide the orchestration API with WWN information.

In further embodiments, the orchestration API may select front end ports on the virtual service layer which may be used to access the volume. In most embodiments, an Orchestration API may examine the inventory of front-end ports in a database and may select the appropriate port(s) based on a set of criteria. In an embodiment, the number of ports to be selected may be taken from a value in the Class of Service (CoS) entry used to create the volume. In another embodiment, ports may be selected if the port has visibility to the SAN fabric or VSAN containing the initiator(s). In other embodiments, if multiple ports are to be selected the selection may be based on maximizing the redundancy (i.e. choosing ports on different virtual service layer locations or directors). In still further embodiments, port affinity may be used to reuse the same ports for the same Storage Service. In still other embodiments, database entries for the virtual service layer front-end ports may contain a WWN. In further embodiments, the database entries for the virtual service layer may contain WWN values, the port value WWPN that identifies a particular port, and a node value WWNN that identifies a "node," which may contain multiple ports.

In most embodiments, the orchestration API may create SAN Zones to enable Initiators to access the Storage Ports. In certain embodiments, a Orchestration API may determine the pairs of Initiator WWNs to virtual service layer front-end port WWNs that may need to be paired together into SAN Zones. In further embodiments, the orchestration API may create the Zones automatically using a Network device driver if the zone is not already present.

In some embodiments, the Initiators of a host may be registered with the virtual service layer by the orchestration API. In most embodiments, for the Initiators to be used by a virtual service layer, the initiators may need to be "registered." In certain embodiments, this may mean that the initiator may need to be visible to the network, i.e. have established connectivity to the SAN switches which may control the network. In further embodiments, an Orchestration API may invoke a virtual service layer device driver to register an Initiator.

In most embodiments, it may be necessary to create a storage view. In certain embodiments, a new volume may be added to an existing Storage View. In other embodiments a new storage view may need to be created for a new volume. In at least some embodiments, an Orchestration API may invoke a virtual service layer device driver to create a new Storage View. In certain embodiments, the orchestration API may add selected Storage Ports and Initiators to the storage view.

In some embodiments, the orchestration API may add a volume to be exported to the virtual storage layer Storage View. In most embodiments, an orchestration API may invoke a virtual service layer device driver to add the volume to the virtual storage layer Storage View.

In certain embodiments, the current disclosure may be enabled to migrate volumes and the associated data from one storage array or device to another storage array or device. In certain embodiments, it may be necessary to determine the number of new storage volumes required to migrate a virtual volume. In other embodiments, it may be necessary to determine the storage arrays on which the storage volumes may be created. In further embodiments, it may be necessary to determine from which storage pools the storage volumes are to be allocated.

In most embodiments, a client may specify a virtual volume to be migrated. In certain embodiments, for a local virtual volume, a client may specify the Class of Service (CoS) required for the new storage volume to which the data on the local virtual volume will be migrated. In other embodiments, for a distributed virtual volume, which may utilize backend storage volumes in multiple neighborhoods corresponding to the geographic location of the virtual service layer clusters, a CoS may be specified for a neighborhood or region of connectivity. In some embodiments, using the class of service and determined information, an orchestration API may identify storage arrays with suitable storage pools that satisfy the specified CoS and have available free capacity to create the storage volume(s) to which the data of the specified virtual volume may be migrated.

In most embodiments, an orchestration API may create the storage volume(s) on the backend storage array(s). In certain embodiments for a virtual volume, an orchestration API may create two volumes. In some embodiments, creation of storage array may be done using a device driver for the storage mediums or storage arrays on which the volume is created.

In at least some embodiments, an orchestration API may create connectivity by creating SAN zones between the backend storage arrays and the virtual service layer back end ports. In certain embodiments, the orchestration API may make one set of connectivity for a local virtual volume. In other embodiments, an orchestration API may create two or more types of connectivity for a distributed virtual volume. In at least some embodiments, the orchestration API may select frontend ports of a storage array and backend ports of a virtual storage layer used for the virtual volume. In most embodiments, the orchestration API may create the appropriate zone(s) or connectivity in each neighborhood. In other embodiments, the orchestration API may reuse existing zones to support communication for new volumes.

In certain embodiments, an orchestration API may configure a storage array storage group containing backend virtual service layer ports (initiators), storage volumes, and frontend storage array ports (targets). In certain embodiments, the configuration may be performed once for a local virtual volume. In other embodiments, the configuration may be performed two or more times for a virtual volume. In still further embodiments, a storage volume may be added to an existing storage group. In most embodiments, an Orchestration engine may call a device driver to configure a storage group. In some embodiments, configuration may involve sub-steps of creating an export mask or masking view, creating initiators or host entries as determined by the device driver.

In some embodiments, the Orchestration API may enable a storage volume to be claimed by a virtual storage layer. In most embodiments, for a storage volume to be claimed by a virtual storage layer, the virtual storage layer may need to be able to see the storage volume. In most embodiments, an Orchestration layer may use a virtual service layer device driver to perform a "rediscovery" operation on the virtual service layer to locate the storage a newly created storage volume. In other embodiments, if a virtual service layer has discovered a storage volume, the virtual storage layer may claim the volume.

In at least some embodiments, virtual volume extents may be created for the virtual volumes to determine what portion of the virtual volume may be used. In certain embodiments, an Orchestration API may use a virtual service layer to create the extent(s) for a storage volume claimed by a virtual service layer.

In certain embodiments, when migrating a local virtual volume a storage volume may be created for the local volume. In other embodiments, when migrating a distributed virtual volume, the orchestration API may enable extents to be migrated directly. In some embodiments, the data on the current extents (or source extents) of the distributed virtual volume may be migrated to the new extents (or target extents). In most embodiments, the orchestration API may use a virtual service layer device driver to create a local device on an extent.

In certain embodiments, a virtual service layer migration may be created to start the data migration of the virtual volume to new storage volumes. In certain embodiments, for a local virtual volume, a device migration may be created. In these embodiments, the device migration may migrate the data on the current local device (or source device) to the newly created local device (or target device). In other embodiments, for a distributed virtual volume an extent migration may be created. In these embodiments, the extent migration may migrate the data on the current extents (or source extents) to the newly created extents (or target extents). In some embodiments, the orchestration API may use a virtual service layer device driver to create the appropriate migration, resulting in the data on the current backend storage volume(s) used by the virtual volume to be migrated to the new backend storage volume(s).

In most embodiments, the orchestration API may monitor the migration progress until complete. In some embodiments, a migration may not be finalized until the data migration completes and the migration is committed. In still further embodiments, upon completion of data migration, the migration may be committed. In most embodiments, once the virtual volume is committed the virtual storage layer may now use the new storage volume(s) created for the migration and the previous storage volumes may be used for other virtual volumes or otherwise deprovisioned. In further embodiments, the Orchestration API may automatically commit a migration for the virtual storage layer upon completion of the migration.

In certain embodiments, upon committing the completed data migration, an Orchestration API may delete or reprovision the storage used for the migrated virtual volume. In some embodiments, a local device and extent may exist for reprovisioning. In other embodiments, old extents may exist for reprovisioning.

In some embodiments, the virtual service layer may keep a record of the migration. In certain embodiments, after successful completion of a migration, the Orchestration API may delete the migration record. In other embodiments, the Orchestration API may delete previously used backend storage volume(s).

In certain embodiments, it may be desirable to migrate a service and storage, such as a first service. In some embodiments, the Orchestration API may create a second service on the storage to which the data will be migrated. In at least one embodiment, the second service may be attached to the virtual service layer, which may expose the storage in the virtual service layer to the second service. In further embodiments, the orchestration API may re-synchronize the services into the same compute cluster of the cloud management tool (e.g.: VMWare vSphere). In some embodiments, the orchestration API may deactivate hosts in the first service, which may enable VMs or applications running on the deactivated host to be moved to the second service. In still further embodiments, once the VMs have been transferred, the first standard service may be detached.

A discussion of some types of virtual storage may be found in U.S. Pat. No. 7,206,863, entitled "SYSTEM AND METHOD FOR MANAGING STORAGE NETWORKS AND PROVIDING VIRTUALIZATION OF RESOURCES IN SUCH A NETWORK" issued on Apr. 17, 2007, to EMC Corp, U.S. Pat. No. 7,770,059, entitled "FAILURE PROTECTION IN AN ENVIRONMENT INCLUDING VIRTUALIZATION OF NETWORKED STORAGE RESOURCES" issued on Aug. 3, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK" issued on Jun. 15, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK USING ONE OR MORE ASICS" issued on Nov. 17, 2009, to EMC Corp, U.S. Pat. No. 7,620,774, entitled "SYSTEM AND METHOD FOR MANAGING STORAGE NETWORKS AND PROVIDING VIRTUALIZATION OF RESOURCES IN SUCH A NETWORK USING ONE OR MORE CONTROL PATH CONTROLLERS WITH AN EMBEDDED ASIC ON EACH CONTROLLER" issued on Nov. 17, 2009, to EMC Corp, U.S. Pat. No. 7,225,317, entitled "SYSTEM AND METHOD FOR MANAGING STORAGE NETWORKS AND FOR MANAGING SCALABILITY OF VOLUMES IN SUCH A NETWORK" issued on May 29, 2007, to EMC Corp, U.S. Pat. No. 7,315,914, entitled "SYSTEMS AND METHODS FOR MANAGING VIRTUALIZED LOGICAL UNITS USING VENDOR SPECIFIC STORAGE ARRAY COMMANDS" issued on Jan. 1, 2008, to EMC Corp, and U.S. Pat. No. 7,216,264, entitled "SYSTEM AND METHOD FOR MANAGING STORAGE NETWORKS AND FOR HANDLING ERRORS IN SUCH A NETWORK" issued on May 8, 2007, to EMC Corp, all of which are hereby incorporated by reference.

Refer now to the embodiment of FIG. 1. In this embodiment, virtual volume presenter 185 is communicatively coupled to site 1 110 and site 2 150. At each site, virtual volume presenter 185 appears to that site to present, as being located at that site, virtual volumes 125. In this embodiments, the storage corresponding to virtual volume 125 is stored on storage 135 and storage 180 respectively. The data may be mirrored by data mirror 190. Thus, virtual volume presenter 185 appears to present the same Virtual Volumes 125, which may be a distributed virtual volume, at both geographically disperse sites 110 and site 150. In this embodiment, the method of ensuring data consistency between storage 135 and 180 is referred to as a mirror. In other embodiments, different methods including redirection of I/O requests by the virtual volume may be used to ensure consistency of the volume presented to the host/VM space. In this embodiment, the data may be mirrored between two sites. In certain embodiments, the data may be mirrored through the use of a mirror. In other embodiments, the data may be mirrored by replication, copying of the data, redirection of the data request, or another data consistency techniques.

Figure 2:
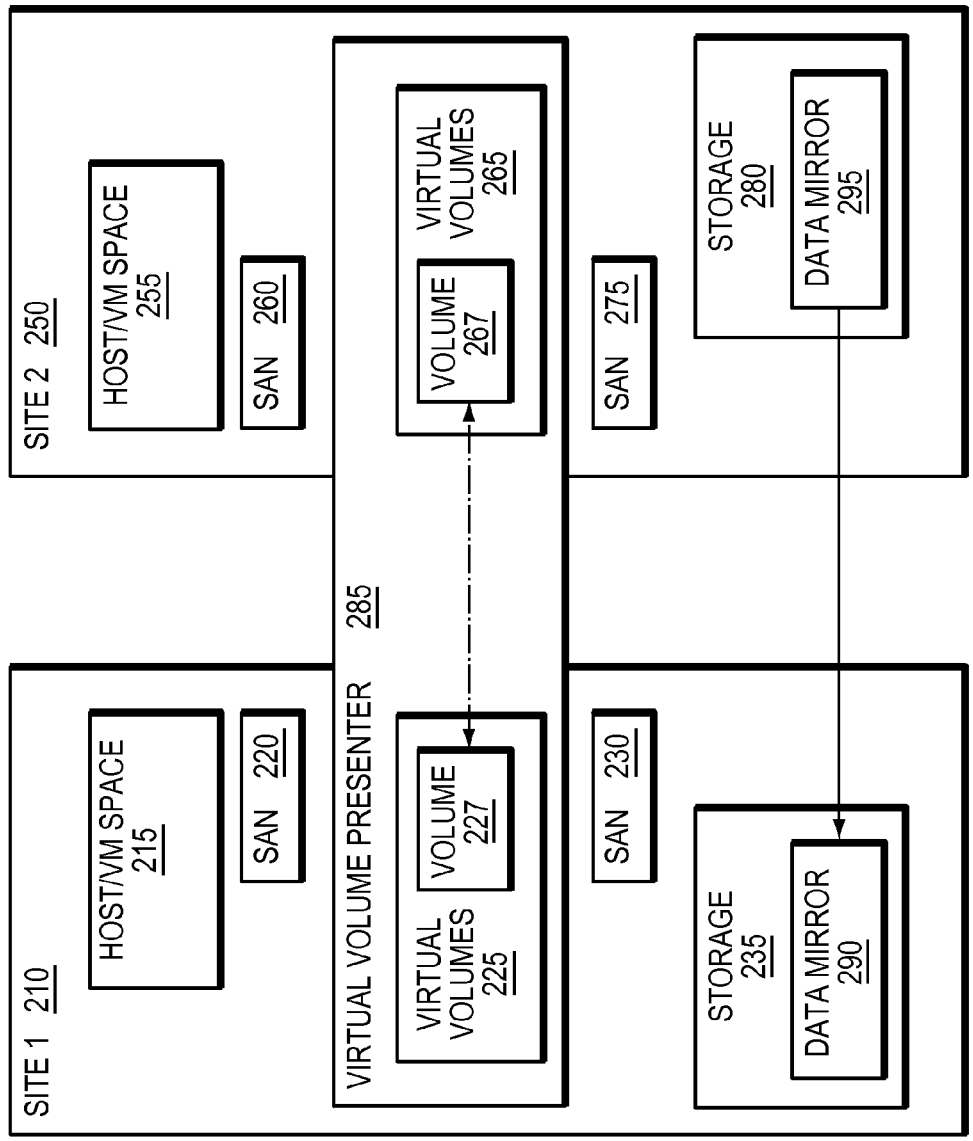
FIG. 2 is an alternative simplified illustration of a data protection system, in accordance with an embodiment of the present disclosure.
Figure 3:
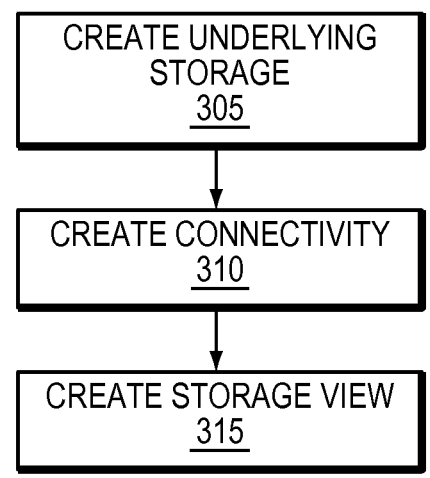
FIG. 3 is a simplified example of a method for orchestrating a provisioning request, in accordance with an embodiment of the present disclosure.

Refer now to the embodiments of FIGS. 2 and 3, which show a simplified process for creating a virtual volume. Underlying storage 290 and 295 are created on storage 235 and 280, respectively (step 305) to mirror the data from the sites. Connectivity between storage 235 and virtual volume presenter 285 is created using SAN 230 (step 310). Connectivity between host/VM space 215 and virtual volume presenter is created using SAN 220 (step 310). Connectivity between storage 280 and virtual volume presenter 285 is created using SAN 275 (step 310). Connectivity between host/VM space 255 and virtual volume presenter 285 is created using SAN 260 (step 310). Virtual volumes 227 and 267 are set up to be displayed to host/VM space 215 and host VM space 255 (step 315). Typically, these steps are executed by an administrator through several different APIs.

Figure 4:
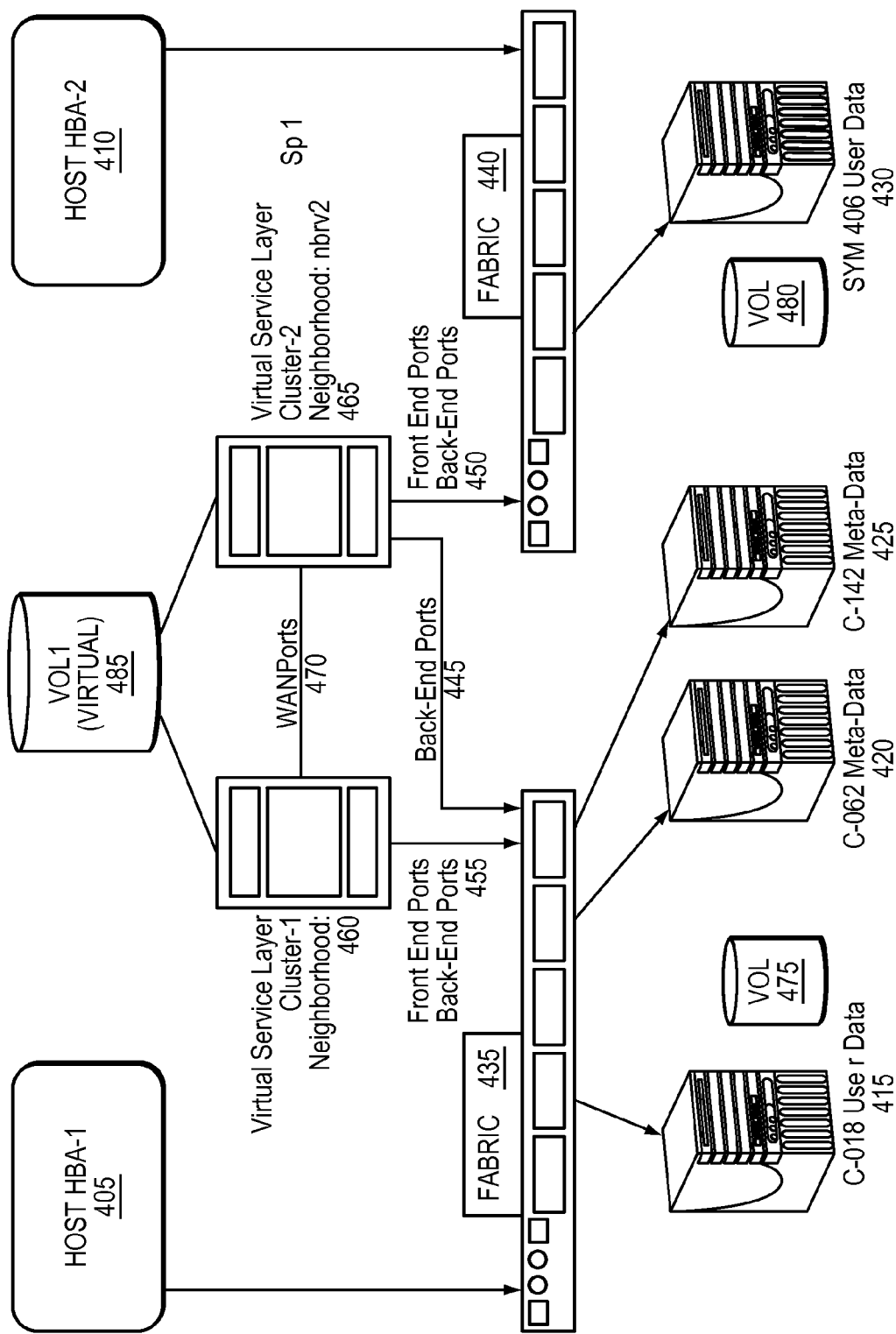
FIG. 4 is a simplified alternative illustration of a data protection system, in accordance with an embodiment of the present disclosure.

Refer now to the example embodiment of FIG. 4, which represents a storage environment. Two hosts, HBA 405 and HBA 410 are presented with virtual volume 485. Virtual volume 485 is stored on Celerra 415 and symmetrix 430. Host 405 and 410 are presented with the same logical data on virtual volume 485 regardless of which hosts accesses the data. Fabric 435 creates connectivity from celerra 415 and metadata 420 and 425 to VSL 460. Metadata 420 and 425 provide information for the virtual service layer presenting virtual volume 485. Fabric 435 also connects virtual service layer 460 and is connected to back end ports 445 of virtual service layer 465. Fabric 440 is connected to symmetrix 430, host 410, and virtual service layer 465. Virtual service layer 460 is connected to virtual service layer 465 by wan ports 470. Virtual service layer 460 and virtual service layer 465, in this embodiment EMC's VPLEX, enables virtual volume 485 to be presented to both host 405 and host 410 as the same volume. Celerra 415 has volume 475 and symmetrix 430 has volume 480.

Figure 5:
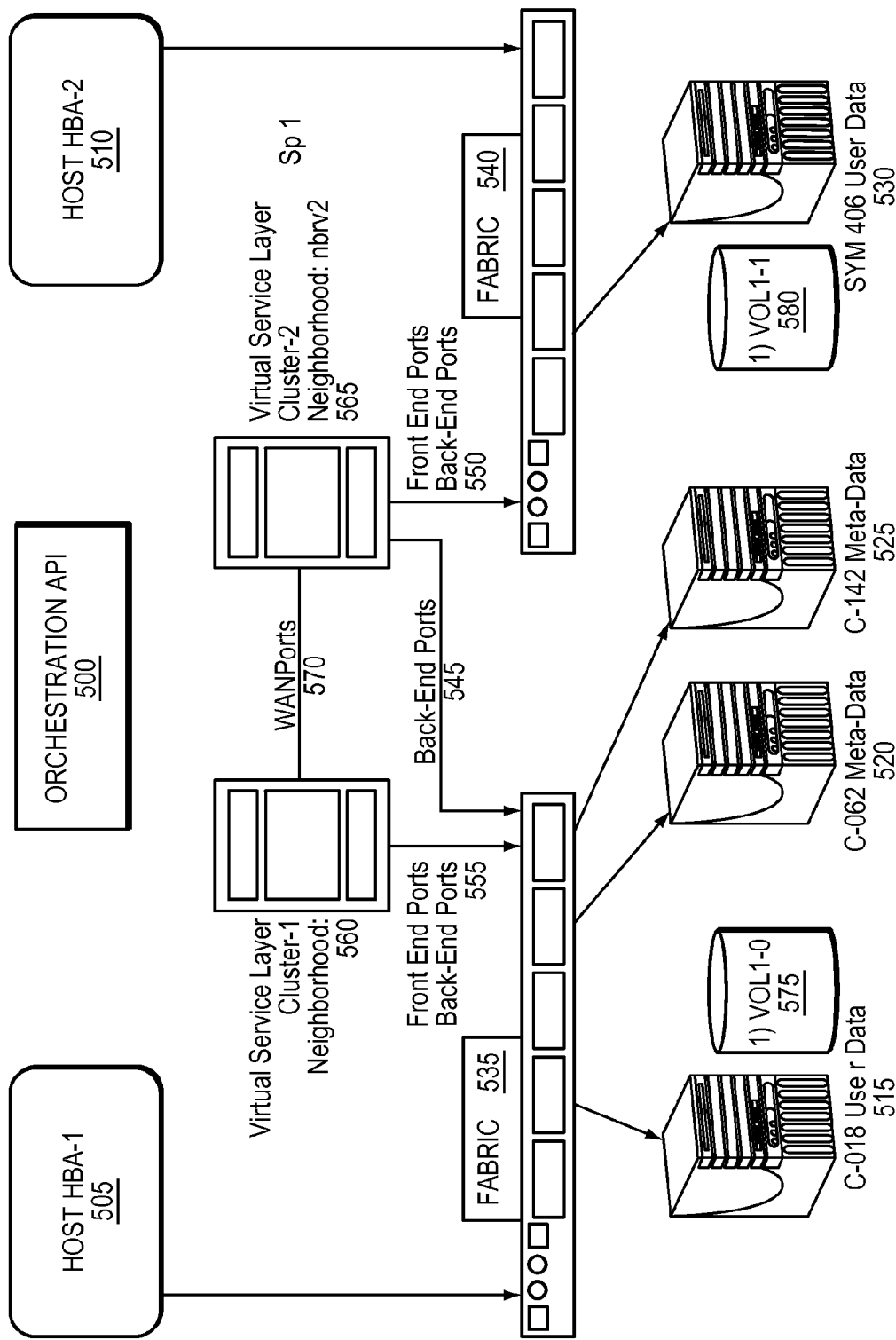
FIG. 5 is a simplified illustration of creating underlying storage in a data protection system, in accordance with an embodiment of the present disclosure.
Figure 9:
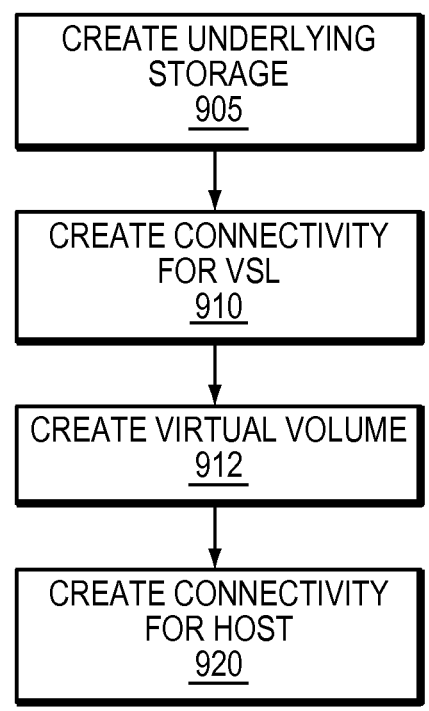
FIG. 9 is a simplified example of a method for orchestrating a provisioning request, in accordance with an embodiment of the present disclosure.

Refer now to the example embodiment of FIGS. 5 and 9, which illustrate creating volumes for a virtual volume. Orchestration API 500 creates the underlying storage volumes necessary for the virtual volume on celerra 515 and symmetrix 530 (step 905). In some embodiments, creating the underlying volume may include determining the number of storage volumes required to make the virtual volume. In most embodiments, creating the underlying storage may determine which storage arrays may be used to create the storage volumes. In further embodiments, creating the storage may include choosing the storage pools from which the volumes will be created. In most embodiments, creating the underlying storage volumes may be based on a Class of Service requested for the volumes.

Figure 6:
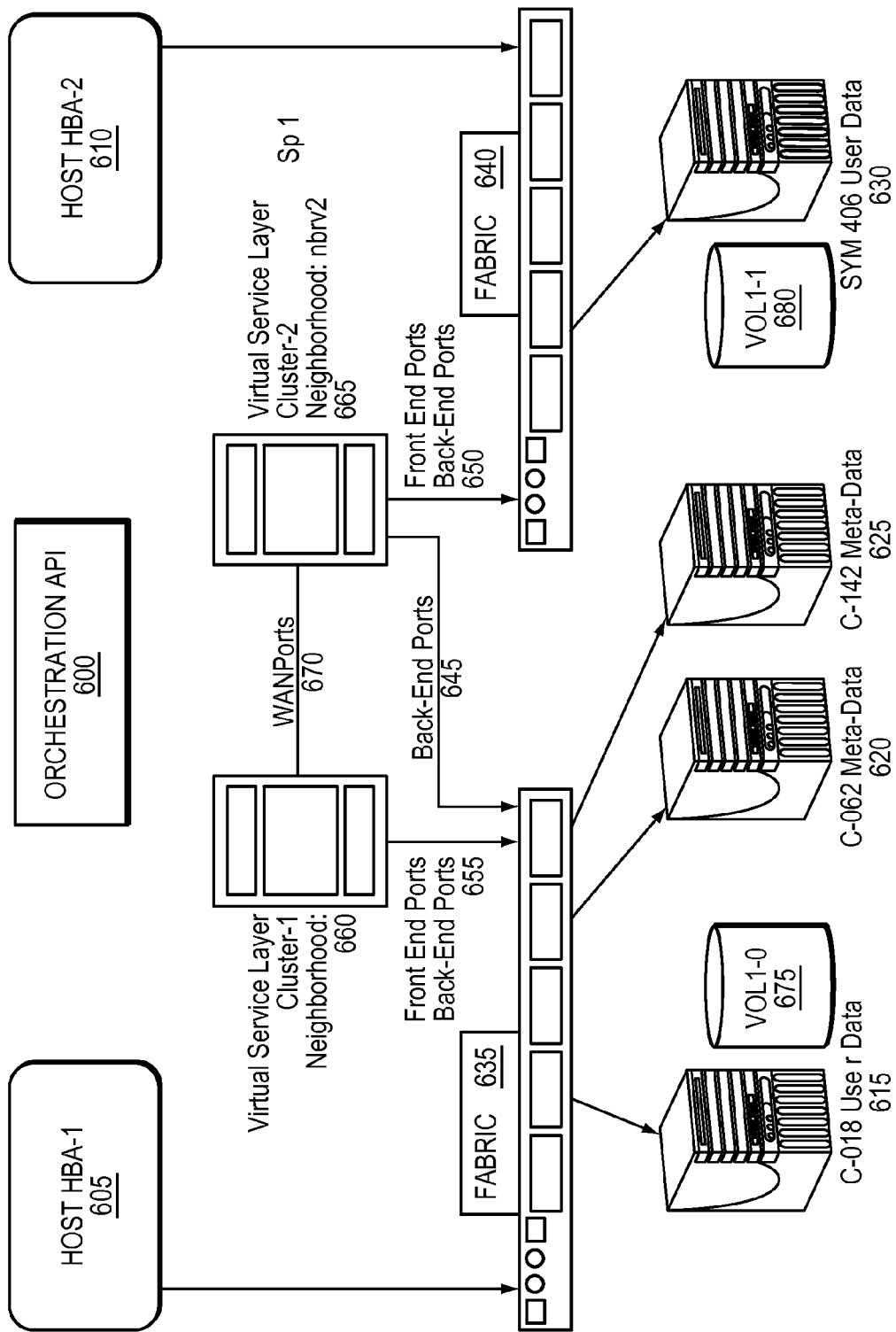
FIG. 6 is an illustration of creating connectivity for a virtual storage layer in a data protection system, in accordance with an embodiment of the present disclosure.

Refer now to the example embodiments of FIGS. 6 and 9, which illustrate creating connectivity between the virtual service layer and volumes (step 910). Orchestration layer 600 creates connectivity between virtual service layer 660 and celerra 675 and virtual service layer 665 and symmetrix 630, enabling virtual service layer 660 to access volume 675 and enabling virtual service layer 665 to access volume 680. In certain embodiments, creating connectivity may include creating SAN Zones between the (underlying) Storage Arrays and the virtual service layer Back End Ports. In some embodiments, creating connectivity may include configuring a Storage Array Export Group containing the Host Initiators, Volumes, and Storage Ports to be used for exporting the volume from the Storage Array to the virtual service layer.

Figure 7:
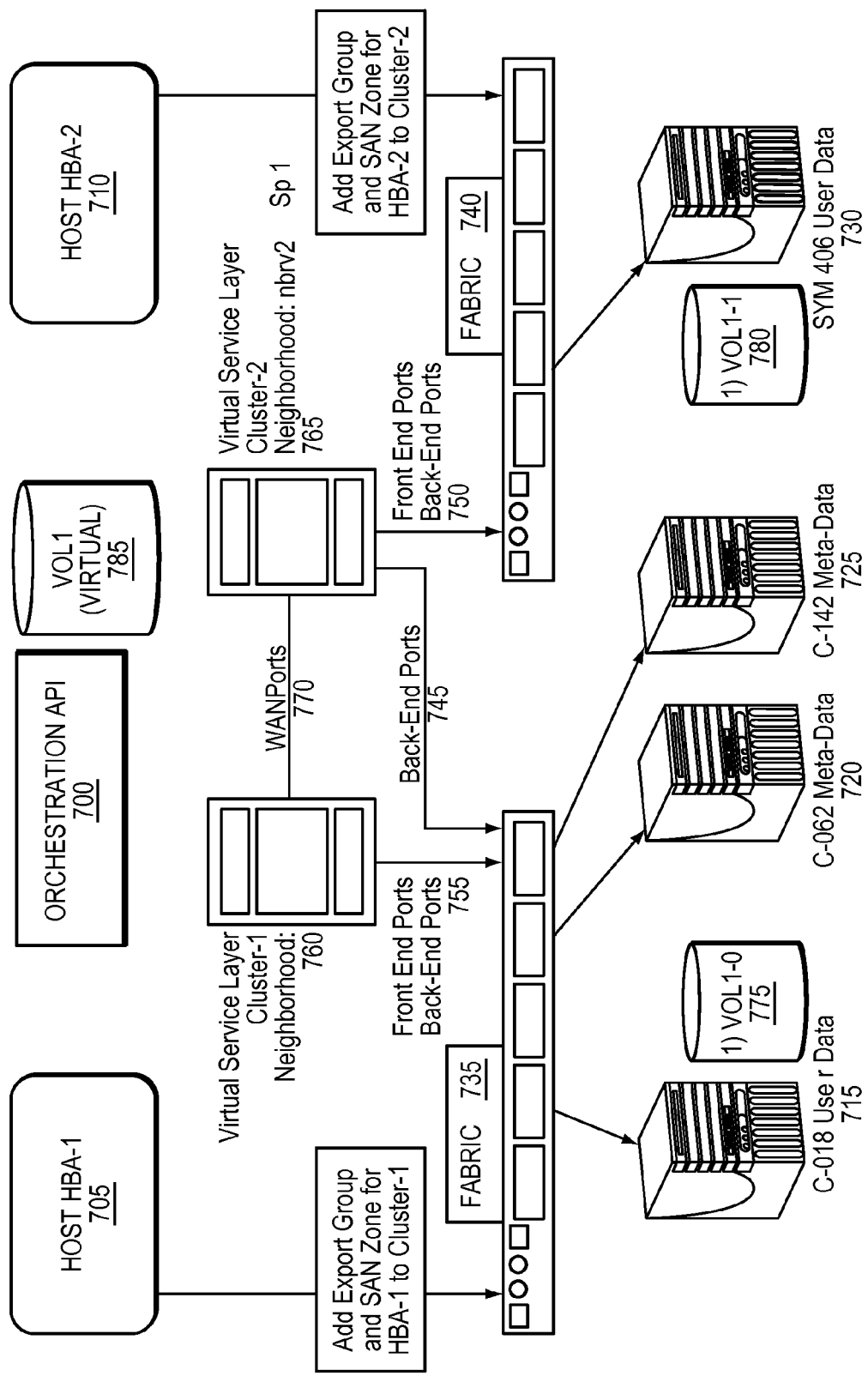
FIG. 7 is a simplified illustration of creating connectivity for a host in a data protection system, in accordance with an embodiment of the present disclosure.

Refer now to the example embodiments of FIGS. 7 and 9, which illustrate setting up a virtual volume. Orchestration layer creates virtual volume 785 on Virtual service layers 760 and 765 (step 912). In some embodiments, creating a virtual volume may include claiming the storage volumes on the virtual service layer. In at least one embodiment, creating the virtual volume may include creating virtual service layer extents representing the storage volumes. In most embodiments, creating the volume may include creating a virtual service layer local device that represents the volume. In alternative embodiments, creating the virtual volume may include creating a distributed device on the virtual service layer. In certain embodiments, creating the volume may include creating a virtual volume.

Figure 8:
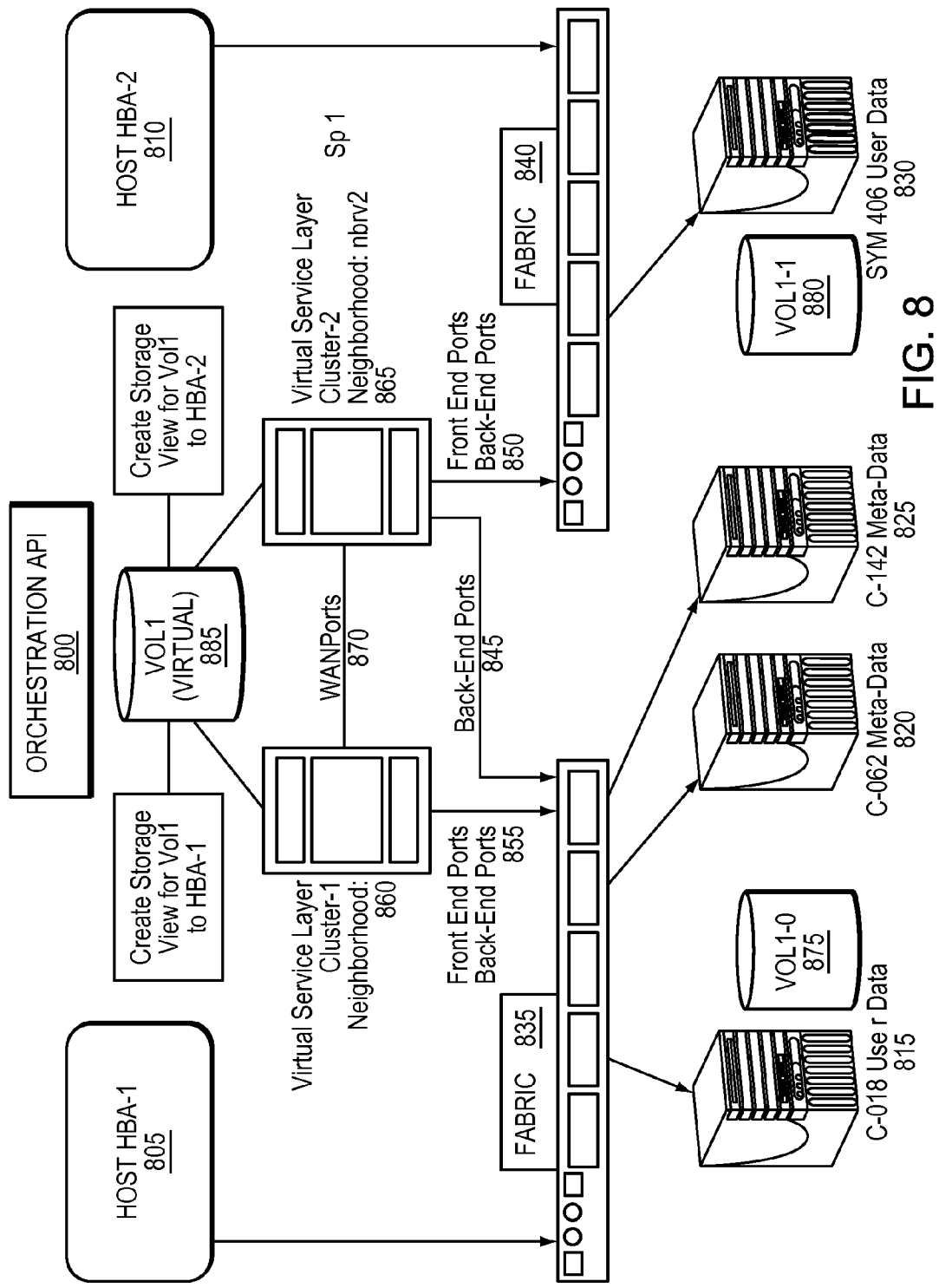
FIG. 8 is a simplified illustration of setting up a virtual volume in a data protection system, in accordance with an embodiment of the present disclosure.

Refer now to the example embodiments of FIGS. 8 and 9, which illustrate creating connectivity between hosts and the virtual service layers. Orchestration API 800 creates connectivity from host 805 to virtual service layer 860 and from host 810 to virtual service layer 865, which allows hosts to see and consume virtual volume 885 (step 920). In certain embodiments, creating connectivity for the host may include determining the world wide name (WWN) address for each of the host's initiators (SAN Ports). In some embodiments, creating connectivity for the host may include selecting front end ports of the virtual service layer to be used to access the volume. In at least one embodiment, creating connectivity to the host may include creating SAN zones to enable initiators to access storage ports. In at least some embodiments, creating access for the host may include registering the initiators on the virtual service layer. In other embodiments, creating connectivity for the host may include creating a storage view. In some embodiments, creating connectivity for the host may include adding a volume to a storage view. In further embodiments, creating connectivity to the host may include adding the volume to be exported to the host to a virtual service layer view.

Figure 10:
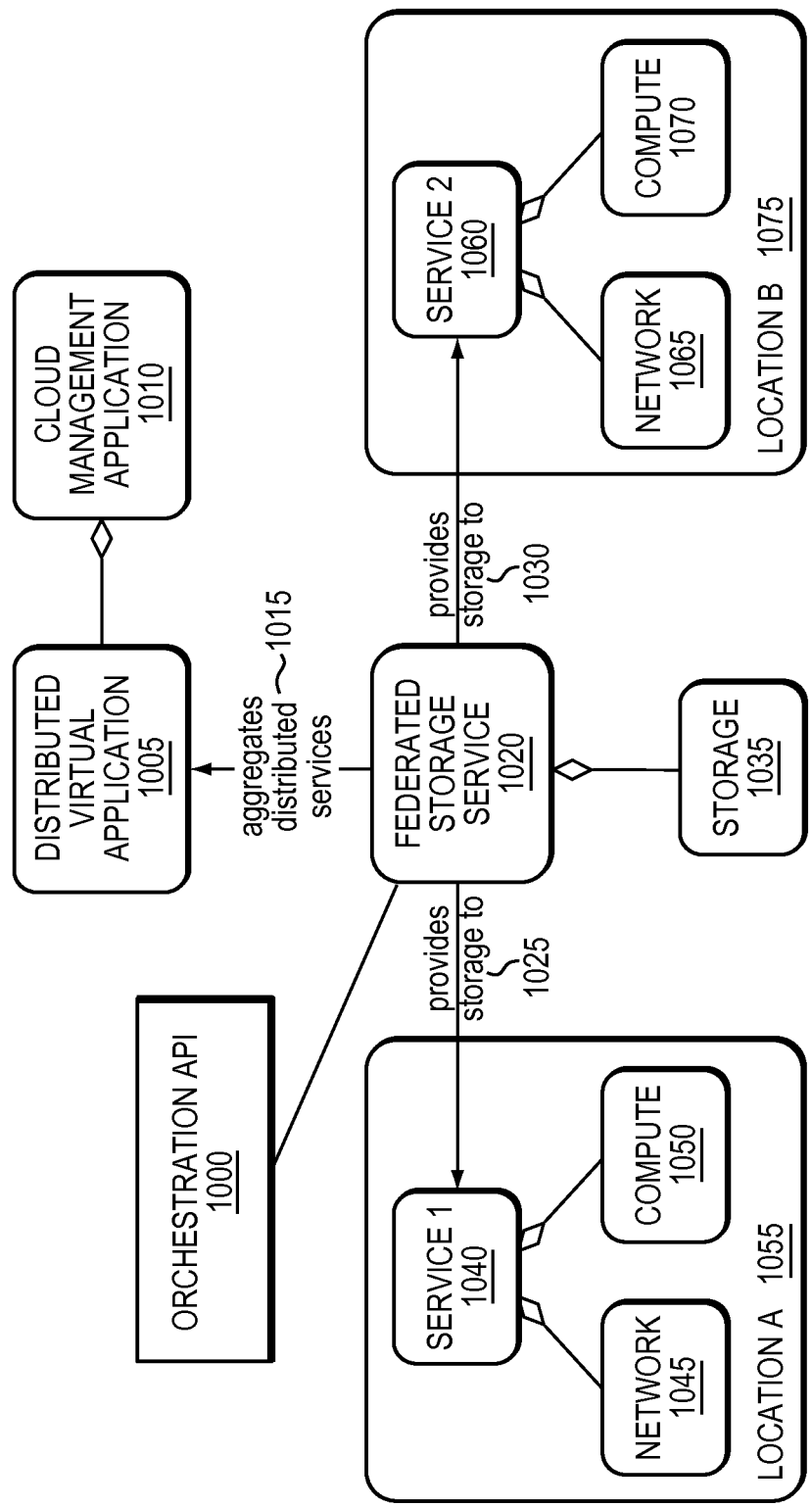
FIG. 10 is a simplified alternative illustration of a data protection environment which exposes services and storage, in accordance with an embodiment of the present disclosure.

Refer now to the example embodiment of FIG. 10. Distributed virtual application 1005 is an application using storage or a virtual machine. Cloud management application 1010 is managing distributed virtual application 1005 as a single entity. Federated storage service 1020 provides storage and services to distributed virtual application 1005 by providing storage to service 1 1040 and service 2 1060 through storage 1035. Service 1040 provides network and computer via network 1045 and compute 1050 on location a 1055 to distributed virtual application 1005 through federated storage service 1020. Service 2 1060 provides network and computer via network 1065 and compute 1070 at location b 1075 to distributed virtual application 1005 federated storage service 1020.

Figure 11:
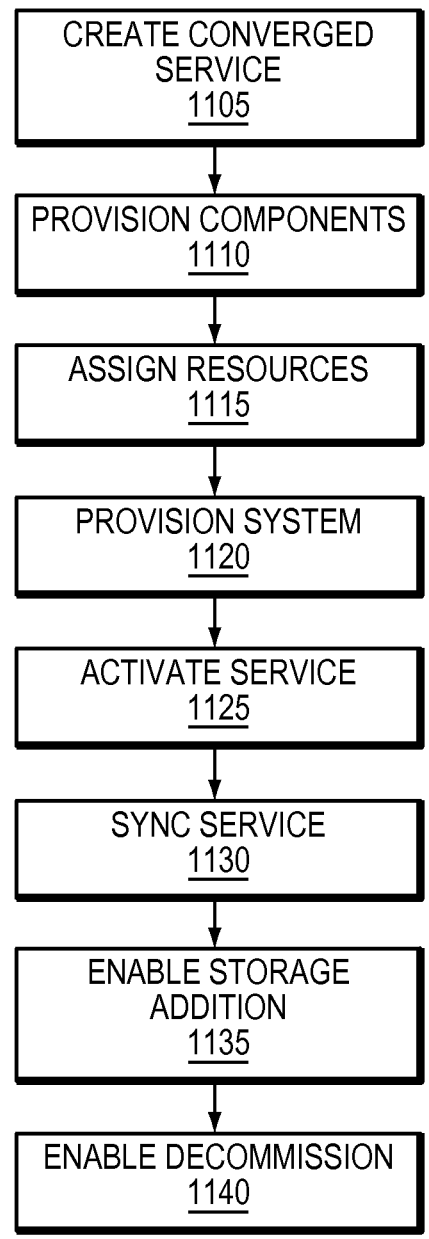
FIG. 11 is a simplified example of a method for orchestrating a service provisioning request, in accordance with an embodiment of the present disclosure.

Refer now as well to the example embodiment of FIG. 11, illustrating how the federated storage service of FIG. 10 may be created. Orchestration API 1000 creates one or more converged services (aka: 'standard services'), which may contain Hosts, Network components (switches, network interfaces, etc), and Storage (such as boot volumes of the hosts—where the operating system files reside) (step 1105). Orchestration API 1000 provisions components of those standard services (step 1110). Orchestration API 1000 assigns and tracks resources in pools to components (e.g.: WWNs, IP addresses, UUIDs, MAC addresses, etc) (step 1115). Orchestration API 1000 enables a user to attach services to pre-existing storage services and provision the system to expose storage in the storage service to hosts in the standard services (step 1120). Orchestration API 1000 allows the user to activate the services (boot up the hosts and makes the service available) (step 1125). Orchestration API 1000 allows user to synchronize the standard services that are attached to storage service into one compute cluster in the cloud management tool (e.g.: vSphere) (step 1130). Orchestration API 1000 allows user to elastically add more storage to storage service and expose additional storage to the standard services attached to it (step 1135). Orchestration API 1000 allows user to decommission storage from storage service, as well as hosts and network resources from standard services (step 1140).

Figure 12:
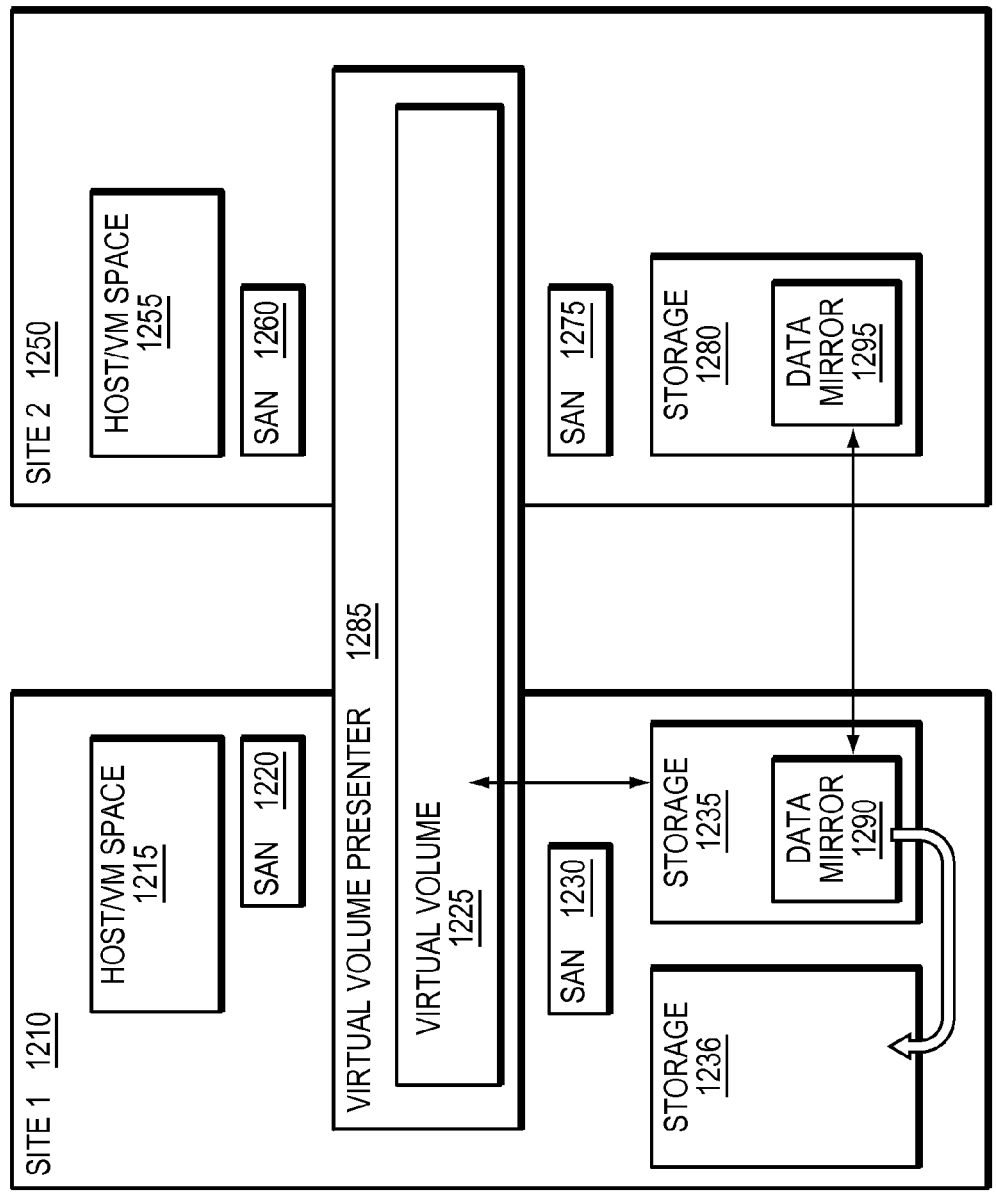
FIG. 12 is a simplified alternative illustration determining a target for data migration, in accordance with an embodiment of the present disclosure.
Figure 17:
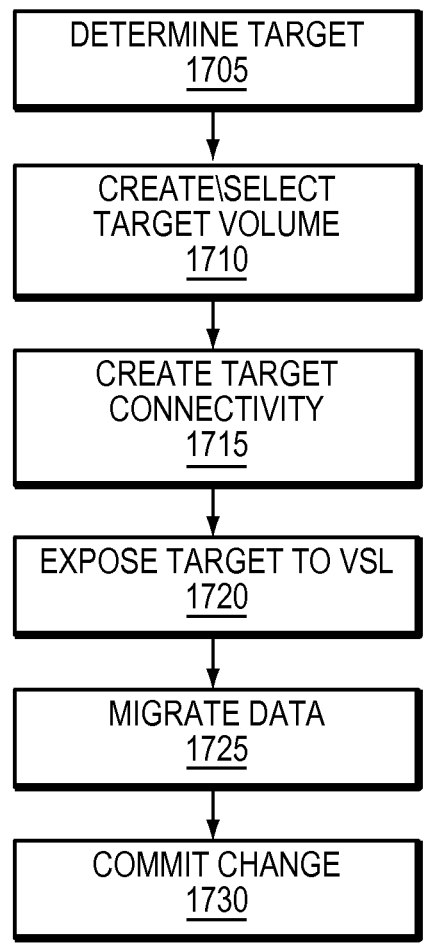
FIG. 17 is a simplified example of a method for data migration, in accordance with an embodiment of the present disclosure.

Refer now to the example embodiments of FIGS. 12 and 17. In the example embodiment of FIG. 12 a migration of the data on data mirror 1290 on storage 1235 presented as virtual volume 1225 by virtual volume presenter 1285 is to occur. A determination is made that storage 1236 satisfies the storage requirements necessary for the data to be migrated (step 1705). In this embodiment, this includes matching the Class of Service and storage parameters necessary to store the data on data mirror 1290.

Figure 13:
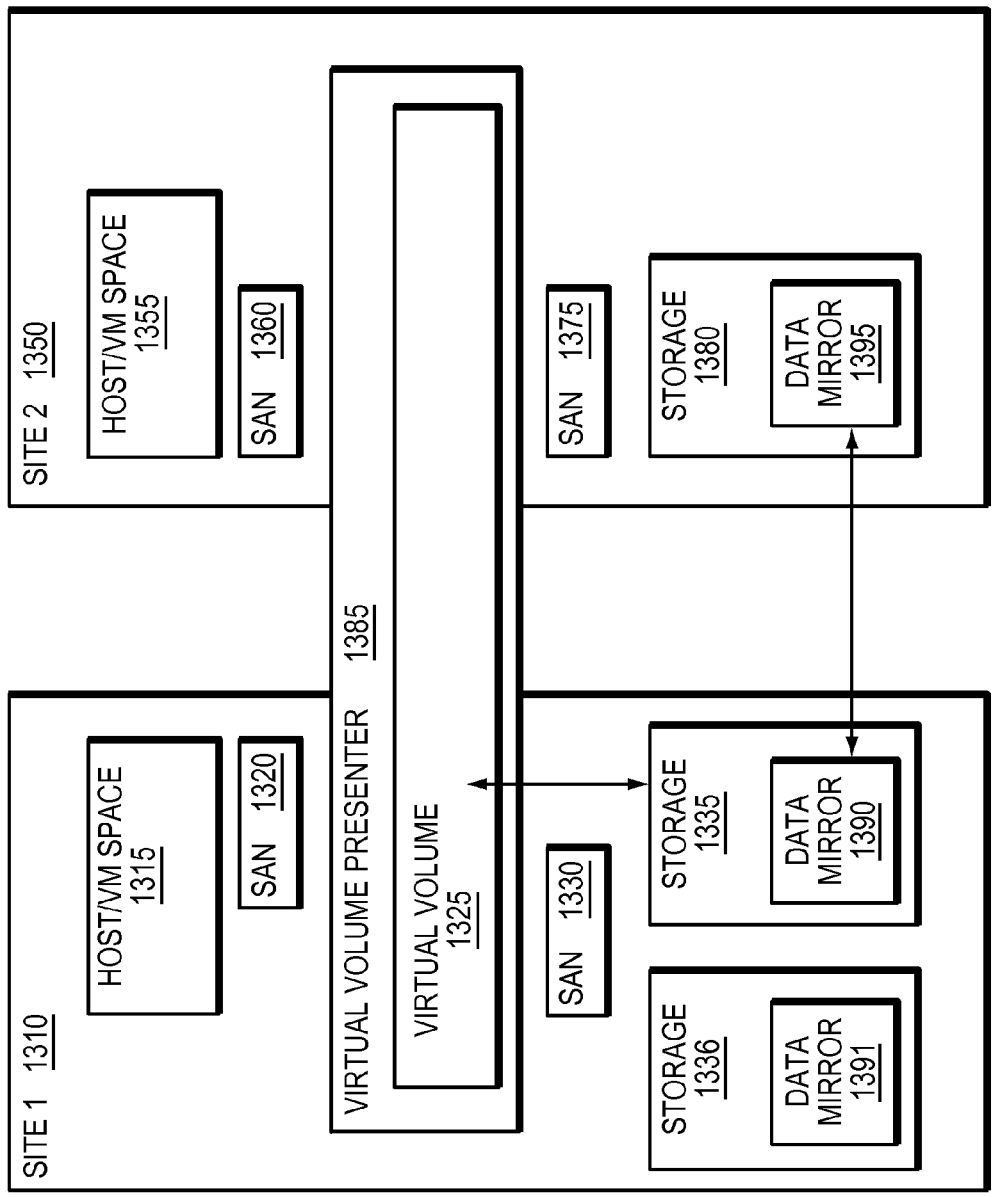
FIG. 13 is a simplified alternative illustration creating a target volume for data migration, in accordance with an embodiment of the present disclosure.

Refer now to the example embodiment of FIGS. 13 and 17. In these example embodiments, data mirror 1391 is created (step 1710). In this embodiment data mirror 1391, once migrated from data mirror 1390, is a volume that will have its data mirrored to data mirror 1395 and data mirror 1395 will have its data mirrored to data mirror 1391. In these embodiments, the data mirrors are not mirrors, rather the data is kept consistent between the devices using replication, mirroring, or other known techniques.

Figure 14:
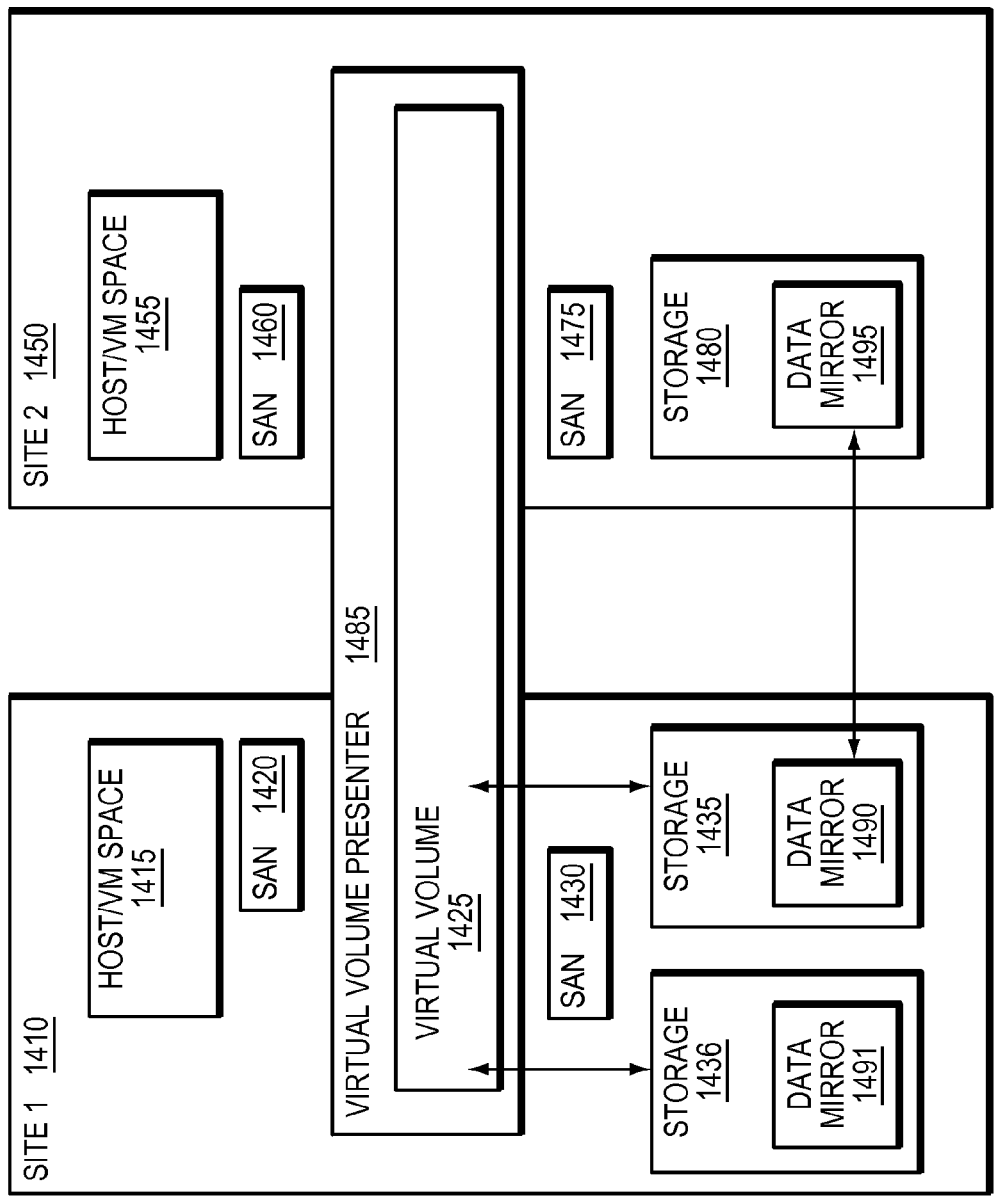
FIG. 14 is a simplified alternative illustration creating target connectivity and exposing the target for data migration, in accordance with an embodiment of the present disclosure.

Refer now to the example embodiments of FIGS. 14 and 17. Connectivity is created between data mirror 1491 on storage 1436 and virtual volume presenter 1485 through SAN 1430 (step 1715). Data mirror 1491 is exposed to virtual volume presenter 1485 (step 1720).

Figure 15:
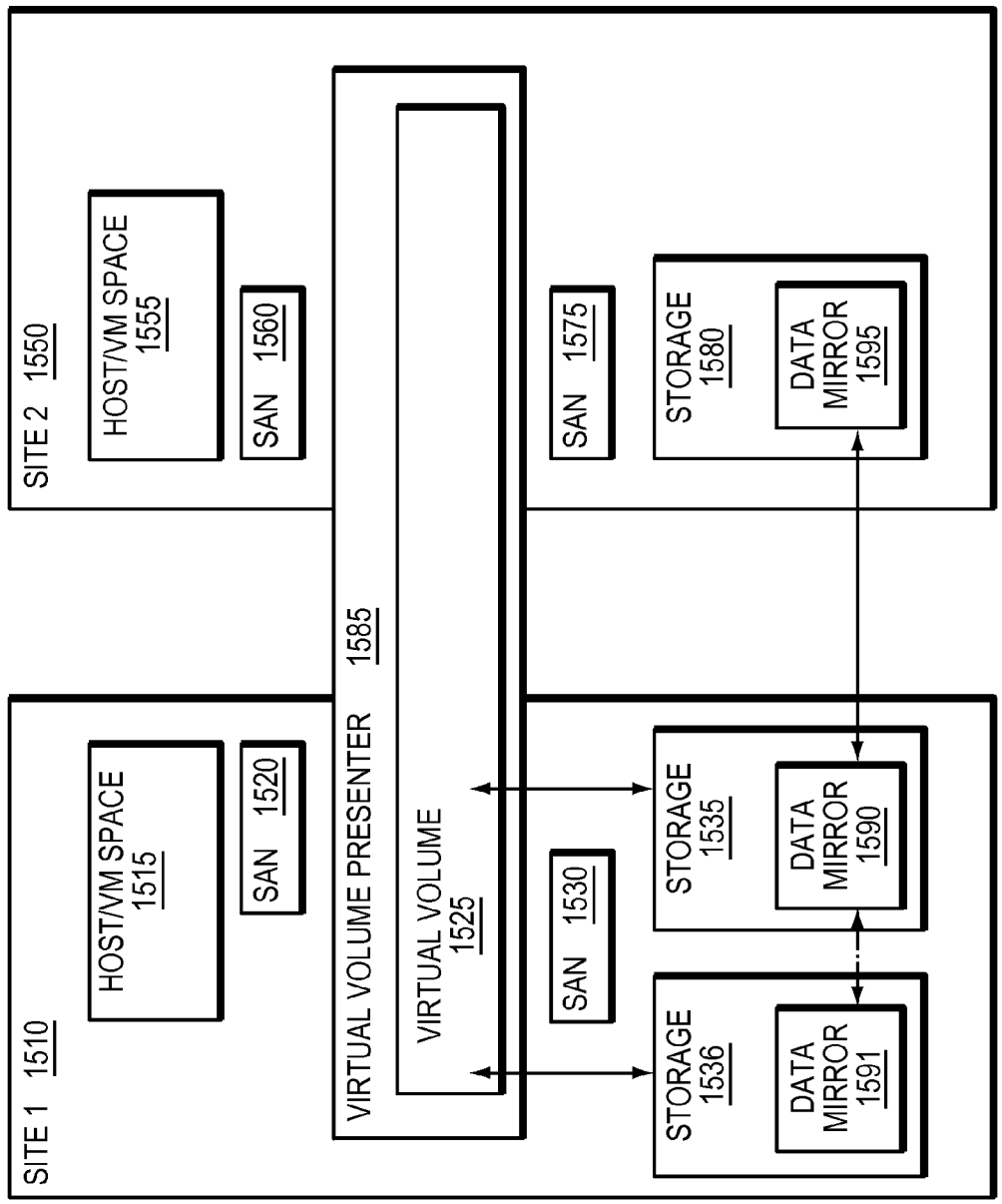
FIG. 15 is a simplified alternative illustration of migrating data, in accordance with an embodiment of the present disclosure.
Figure 16:
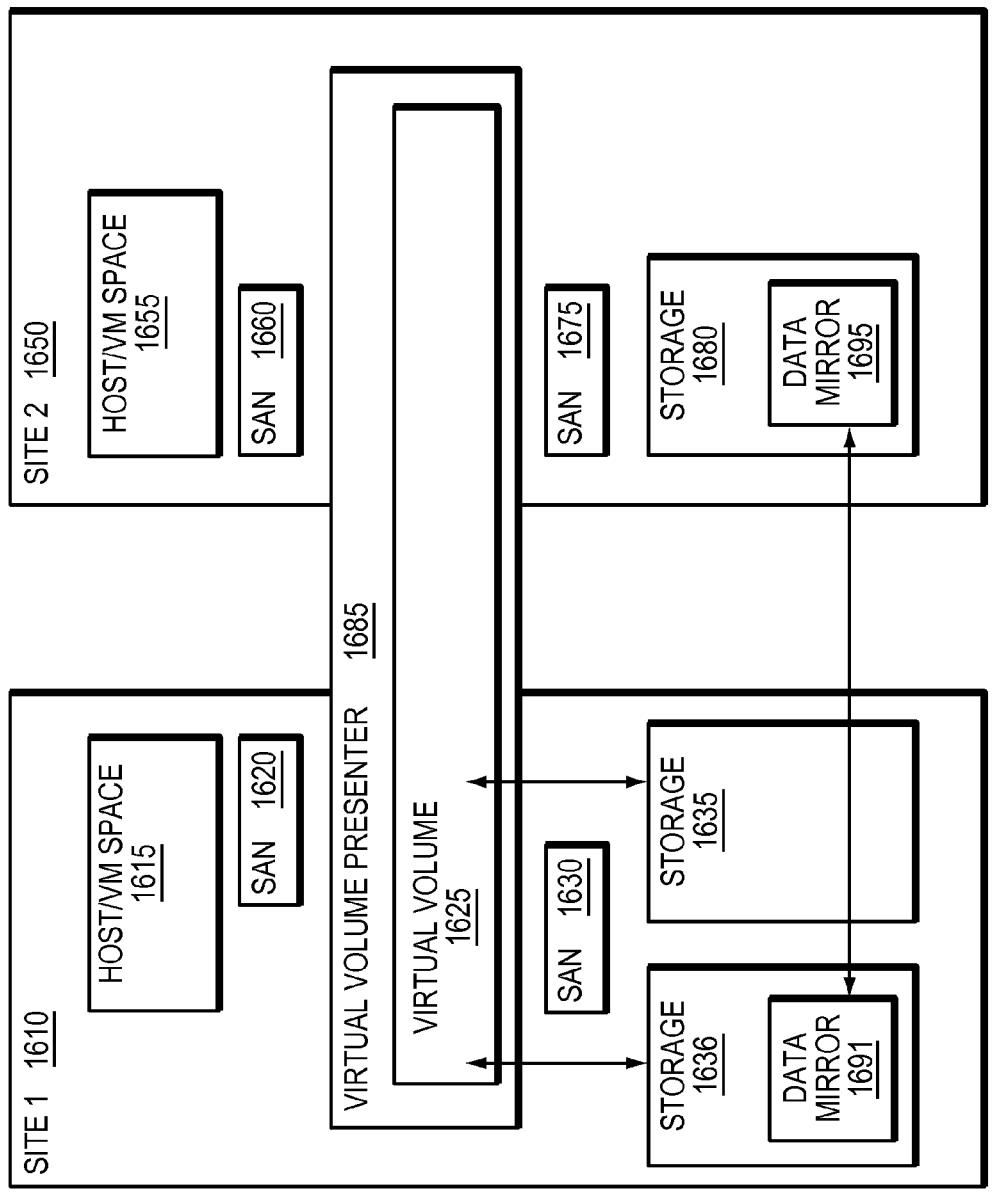
FIG. 16 is a simplified alternative illustration committing a data migration in a virtual service layer, in accordance with an embodiment of the present disclosure.

Refer now to the example embodiments of FIGS. 15 and 17. Data is migrated from data mirror 1590 to data mirror 1591 (Step 1725). Refer now to the example embodiments of FIGS. 16 and 17. Upon completion of the migration, the data migration is committed by virtual volume presenter 1685 using data mirror 1691 as the underlying storage on site 1610 for virtual volume 1625. In certain embodiments, the migration may be committed automatically upon completion of the migration. In other embodiments, the migration may be committed after an API request.

In certain embodiments, load balancing may be performed with the Virtual Machines. In some embodiments, load balancing may be a technique where heavily utilized resources can migrate some or all of their workload to lesser utilized resources. In other embodiments, load balancing may be used to increase the performance of a particular application, provide more consistent performance across a number of applications, or to increase the availability of an application. In further embodiments, some criteria that may be used to determine the need to load balance are CPU utilization, I/O utilization, failure of a key resource in the computing network, poor performance of a given application, or a need to perform maintenance on a particular computing resource. In further embodiments, load balancing may be performed to ensure a particular quality of service or service level agreement. In further embodiments, shifting of the VM may be performed based on other environmental variables such as weather instability due to weather phenomenon.

In some embodiments, the current disclosure provides concurrent access and data mobility for data at two geographically disperse sites. In other embodiments, the current disclosure may enable workload balancing and relocation across sites. In further embodiments, the current disclosure enables aggregate data centers and deliver true disaster tolerant, continuous operation. In some embodiments, the current disclosure ensures that all changes are transparently and consistently presented to all hosts, and that they will read only the most recent updates, independent of their source.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Figure 18:
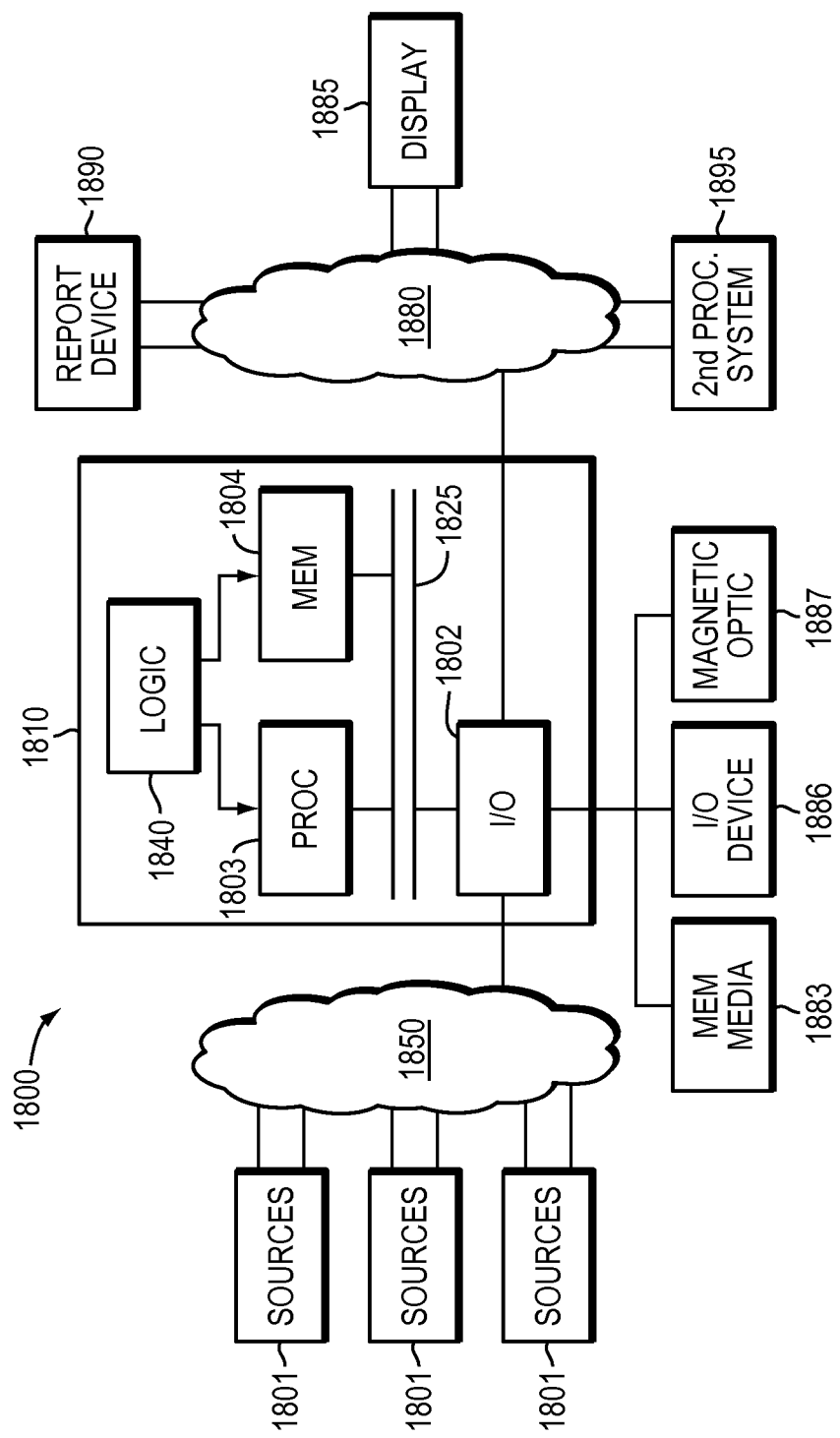
FIG. 18 is an example of an embodiment of an apparatus that may utilize the techniques described herein.
Figure 19:
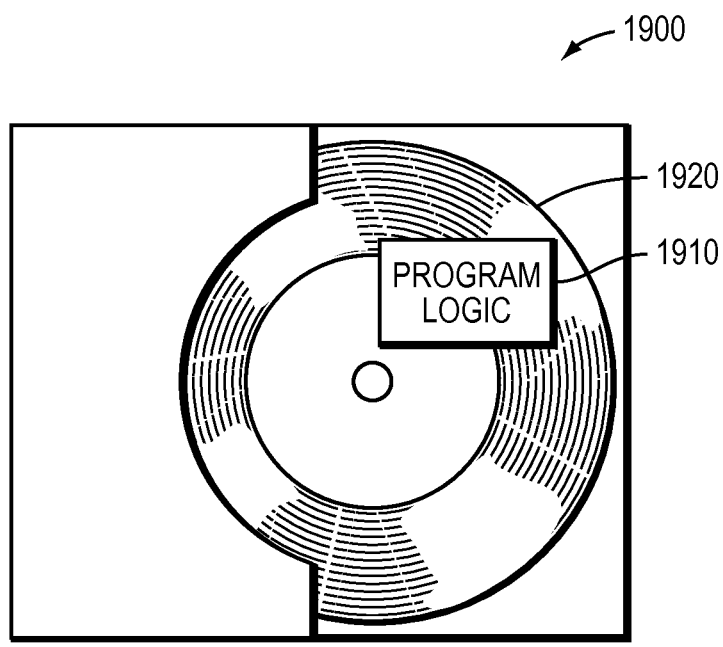
FIG. 19 is an example of an embodiment of a method embodied on a computer readable storage medium that may utilize the techniques described herein.

As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can accessed by a data storage system processor. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 18 the machine becomes an apparatus for practicing the invention. When implemented on one or more general-purpose processors, the program code combines with such a processor 1803 to provide a unique apparatus that operates analogously to specific logic circuits. As such a general purpose digital machine can be transformed into a special purpose digital machine. FIG. 19 shows Program Logic 1934 embodied on a computer-readable medium 1930 as shown, and wherein the Logic is encoded in computer-executable code configured for carrying out the reservation service process of this invention and thereby forming a Computer Program Product 1900. The logic 1934 may be the same logic 1840 on memory 1804 loaded on processor 1803. The program logic may also be embodied in software modules, as modules, or as hardware modules.

The logic for carrying out the method may be embodied as part of the system described above, which is useful for carrying out a method described with reference to embodiments shown in, for example, FIG. 3 and FIG. 10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims. Accordingly, the spirit and scope of the present invention should be limited only by the following claims.

What is claimed is:

1. A system for storage provisioning in a data storage environment, the system comprising:
   a storage provisioning interface; and
   computer-executable program code operating in memory coupled with a processor in communication with a database, wherein the computer-executable program code is configured to enable a processor to execute logic to enable:
   provisioning of a storage volume across network resources through the storage provisioning interface; wherein the storage provisioning interface enables provisioning of network resources to enable presentation of a provisioned storage volume; wherein the provisioned storage volume is enabled to be provisioned across a plurality of file, block, and object storage resources across the network resources; wherein the provisioned storage volume is enabled to be a redundant distributed volume; and wherein the provisioning enables orchestration of federated storage to heterogeneous storage platforms to support storage and network components; wherein the heterogeneous storage platforms are enabled to include one or more file, block, and object storage platforms; wherein if the storage resources include a block resource, a file resource, and an object resource, the provisioned storage volume is enabled to be spread across at least the block resource, the file resource, and the object resource.

2. The system of claim 1 wherein the provisioning enables the provisioned storage volume to be accessed concurrently in a read-write state in two geographically disparate locations.

3. The system of claim 2 wherein the provisioning enables the provisioned storage volume presented to a user to be mapped to different types of underlying storage arrays at the geographically disparate locations.

4. The system of claim 1 wherein the provisioning of network resources is enabled to automatically configure a network connectivity when the provisioned storage volume is exposed to a host.

5. The system of claim 1 wherein the provisioning is enabled to automatically configure network connectivity, mapping, and masking operations when the provisioned storage volume is exported to a host.

6. The system of claim 1 wherein the provisioning aggregates distributed storage and compute resources into a single Distributed Virtual Application.

7. The system of claim 1 wherein the storage provisioning interface is enabled to automatically select the network ports when the provisioned storage volume is exported to a host.

8. The system of claim 1 wherein the provisioned storage volume may be automatically reconfigured to use a different set of the plurality of storage resources after it was initially provisioned without interruption of service or having to pause interaction with the provisioned storage volume.

9. A computer implemented method comprising:
provisioning of a storage volume, through a storage provisioning interface, across network resources through the storage provisioning interface; wherein the storage provisioning interface enables provisioning of network resources to enable presentation of a provisioned storage volume; wherein the provisioned storage volume is enabled to be provisioned across a plurality of file, block, and object storage resources across the network resources; wherein the provisioned storage volume is enabled to be a redundant distributed volume; and wherein the provisioning enables orchestration of federated storage to heterogeneous storage platforms to support storage and network components; wherein the heterogeneous storage platforms are enabled to include one or more file, block, and object storage platforms; wherein if the storage resources include a block resource, a file resource, and an object resource, the provisioned storage volume is enabled to be spread across at least the block resource, the file resource, and the object resource.

10. The method of claim 9 wherein the provisioning enables the provisioned storage volume to be accessed concurrently in a read-write state in two geographically disparate locations.

11. The method of claim 9 wherein the provisioning enables the provisioned storage volume presented to a user to be mapped to different types of underlying storage arrays at the geographically disparate locations.

12. The method of claim 9 wherein the provisioning of network resources is enabled to automatically configure a network connectivity when the provisioned storage volume is exposed to a host.

13. The method of claim 9 wherein the provisioning is enabled to automatically configure network connectivity, mapping, and masking operations when the provisioned storage volume is exported to a host.

14. The method of claim 9 wherein the provisioning aggregates distributed storage and compute resources into a single Distributed Virtual Application.

15. The method of claim 9 the storage provisioning interface is enabled to automatically select the network ports when the provisioned storage volume is exported to a host.

16. A computer program product comprising:
a non-transitory computer readable medium encoded with computer executable program, the code enabling:
provisioning of a storage volume, through a storage provisioning interface, across network resources through the storage provisioning interface; wherein the storage provisioning interface enables provisioning of network resources to enable presentation of a provisioned storage volume; wherein the provisioned storage volume is enabled to be provisioned across a plurality of file, block, and object storage resources across the network resources; wherein the provisioned storage volume is enabled to be a redundant distributed volume; and wherein the provisioning enables orchestration of federated storage to heterogeneous storage platforms to support storage and network components; wherein the heterogeneous storage platforms are enabled to include one or more file, block, and object storage platforms; wherein if the storage resources include a block resource, a file resource, and an object resource, the provisioned storage volume is enabled to be spread across at least the block resource, the file resource, and the object resource.

17. The computer program product of claim 16 wherein the provisioning enables the provisioned storage volume to be accessed concurrently in a read-write state in two geographically disparate locations.

18. The computer program product of claim 16 wherein the provisioning enables the provisioned storage volume presented to a user to be mapped to different types of underlying storage arrays at the geographically disparate locations.

19. The computer program product of claim 16 wherein the provisioning of network resources is enabled to automatically configure a network connectivity when the provisioned storage volume is exposed to a host.

20. The computer program product of claim 16 wherein the provisioning is enabled to automatically configure network connectivity, mapping, and masking operations when the provisioned storage volume is exported to a host.

21. The computer program product of claim 16 wherein the block resource comprises a block array; wherein the file resource comprises a file array; and wherein the object resource comprises an object array.

22. The computer implemented method of claim 9 wherein the block resource comprises a block array; wherein the file resource comprises a file array; and wherein the object resource comprises an object array.

23. The system of claim 1 wherein the block resource comprises a block array; wherein the file resource comprises a file array; and wherein the object resource comprises an object array.

* * * * *

UNITED STATES PATENT AND TRADEMARK OFFICE
CERTIFICATE OF CORRECTION

PATENT NO. : 9,535,629 B1  
APPLICATION NO. : 13/886644  
DATED : January 3, 2017  
INVENTOR(S) : Salvatore DeSimone et al.

Page 1 of 1

It is certified that error appears in the above-identified patent and that said Letters Patent is hereby corrected as shown below:

On the Title Page

Column 1, Line 8: "Suresh" should be --Sukesh--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*